(12) United States Patent
Colic (10) Patent No.: US 7,594,996 B2
(45) Date of Patent: Sep. 29, 2009

(54) PETROLEUM RECOVERY AND CLEANING SYSTEM AND PROCESS

(75) Inventor: Miroslav Colic, Goleta, CA (US)

(73) Assignee: Aquatech, LLC, Los Angeles, CA (US)

( * ) Notice: Subject to any disclaimer, the term of this patent is extended or adjusted under 35 U.S.C. 154(b) by 611 days.

(21) Appl. No.: 11/040,268

(22) Filed: Jan. 20, 2005

(65) Prior Publication Data

US 2005/0161372 A1    Jul. 28, 2005

Related U.S. Application Data

(60) Provisional application No. 60/538,819, filed on Jan. 23, 2004.

(51) Int. Cl.
*C10G 1/04*    (2006.01)

(52) U.S. Cl. ............................ 208/391; 208/13; 208/435

(58) Field of Classification Search .................. 208/13, 208/390, 391, 435
See application file for complete search history.

(56) References Cited

U.S. PATENT DOCUMENTS

| | | | | |
|---|---|---|---|---|
| 2,077,745 | A | * | 4/1937 | DeGroote ................... 516/149 |
| 2,711,978 | A | * | 6/1955 | Groom ......................... 134/10 |
| 3,342,264 | A | * | 9/1967 | Willard, Sr. .................. 166/300 |
| 4,162,989 | A | | 7/1979 | Flournoy et al. |
| 4,469,603 | A | | 9/1984 | Lepain et al. |
| 4,614,236 | A | * | 9/1986 | Watkins et al. ............... 166/304 |
| 5,091,016 | A | | 2/1992 | Krajicek et al. |
| 5,093,031 | A | | 3/1992 | Login et al. |
| 5,306,351 | A | | 4/1994 | Anderson |
| 5,530,703 | A | | 6/1996 | Liu et al. |
| 5,678,238 | A | | 10/1997 | Billings et al. |
| 5,835,746 | A | | 11/1998 | Girardeau et al. |
| 5,858,247 | A | | 1/1999 | Campbell |
| 5,968,370 | A | * | 10/1999 | Trim ........................... 210/723 |
| 5,983,275 | A | | 11/1999 | Ecclesine |
| 6,322,621 | B1 | | 11/2001 | Goldman |
| 6,504,842 | B1 | | 1/2003 | Bergenfeld |
| 6,606,317 | B1 | | 8/2003 | Beadle et al. |
| 6,754,211 | B1 | | 6/2004 | Brown |
| 6,775,287 | B1 | | 8/2004 | Fukano et al. |
| 6,778,532 | B1 | | 8/2004 | Akahane et al. |
| 6,783,582 | B2 | | 8/2004 | Goldman |
| 6,879,598 | B2 | | 4/2005 | Zancan et al. |
| 6,911,840 | B1 | | 6/2005 | Milne et al. |
| 6,937,608 | B1 | | 8/2005 | Deng |
| 7,024,489 | B2 | | 4/2006 | Aviles |
| 7,042,893 | B1 | | 5/2006 | Lo et al. |
| 2003/0023762 | A1 | | 1/2003 | Dhir et al. |
| 2003/0081606 | A1 | | 5/2003 | Tamura et al. |
| 2003/0110306 | A1 | | 6/2003 | Bailis et al. |
| 2003/0179711 | A1 | | 9/2003 | Huff |
| 2003/0198224 | A1 | | 10/2003 | Lee et al. |
| 2004/0193852 | A1 | | 9/2004 | Johnson |
| 2006/0146914 | A1 | | 7/2006 | Horvath et al. |

* cited by examiner

*Primary Examiner*—Glenn Caldarola
*Assistant Examiner*—Randy Boyer
(74) *Attorney, Agent, or Firm*—Kelly Lowry & Kelley, LLP (57) ABSTRACT

A system and process are provided for recovering and/or cleaning residual or waste petroleum products such as sludge accumulated within a storage tank or upon process equipment surfaces, or from inorganic materials such as sand or clay, and the like. The system and process include a negatively charged aqueous-based dispersion fluid, which is contacted with the petroleum product under controlled relatively high pressure and high shear conditions for fluidizing hydrocarbon molecules and for preventing such molecules from adherence to process equipment surfaces, or contaminants such as sand or clay. Additional mechanical separation as by subjecting the mixed petroleum product and dispersion fluid slurry to sonic vibration may also be employed. The thus-fluidized slurry of petroleum products, dispersion fluid, and inorganic materials can be separated by conventional techniques, as by settling and/or flotation, for further individual processing and/or reuse.

41 Claims, 7 Drawing Sheets

PETROLEUM RECOVERY AND CLEANING SYSTEM AND PROCESS

This application claims the benefit of U.S. Provisional Application No. 60/538,819, filed Jan. 23, 2004.

BACKGROUND OF THE INVENTION

This invention relates generally to the field of petroleum hydrocarbon production, recovery and handling. More specifically, this invention relates to an improved system and method for fluidizing, separating, and recovering highly viscous residual petroleum products such as sludge and the like which can adhere to inorganic surfaces such as process equipment including pumps, valves, and flow conduits and the like, as well as contaminant solids such as sand or clay and the like. The invention mechanically and chemically separates the residual petroleum products from the associated inorganic material to facilitate processing, to recover otherwise waste or unusable petroleum products, and to clean contaminant solids such as sand or clay in a manner accommodating environmentally compatible re-use or disposal.

In the petroleum industry, subterranean oil deposits are identified and tapped by means of one or more extraction pumps designed to draw flowable crude oil to the surface for subsequent transport by means of pipelines and/or ocean-going tanker vessels and the like to a refinery, whereat the extracted crude oil is processed to produce a wide range of different specific petroleum products and by-products. The petroleum industry, however, is plagued by a number of important problems and limitations, some of which pose significant environmental and worker safety hazards.

More particularly, as crude oil is extracted from a subterranean deposit over a period of time, the subterranean strata particularly in the region close to the extraction pump or well-head gradually becomes clogged or plugged with a highly viscous hydrocarbon-based sludge that is typically mixed with inorganic material such as sand and clay particles and the like. This sludge material effectively reduces the flow of less viscous and recoverable crude oil to the well-head, thereby significantly reducing the crude oil production rate from the subterranean deposit. In some instances, production from an operational but sludge-clogged well-head can become uneconomical with as much as 85% of the oil deposit remaining in the ground, resulting in abandonment of the operational well-head, and, in some cases, costly drilling and installation of a replacement well-head at a different location to resume oil field production.

This viscous hydrocarbon sludge material also contacts and adheres to surfaces of process equipment such as pump, valves, and flow conduits within the well-head and any associated pipeline of other tanks and the like used to transport the crude oil from the oil field to the refinery. Once again, over time, these sludge coatings build up and clog these process equipment surfaces, resulting in reduced pumping and related flow rates. Periodic cleaning of accumulated sludge coatings from process equipment surfaces has been difficult, and normally involves the use of and exposure of workmen to toxic materials and dangerous working conditions, sometimes with minimal cleaning effectiveness. In addition, the accumulated sludge deposits cleaned from such process equipment surfaces, together with solvent-based cleaning solutions, comprise toxic wastes, which are subject to costly handling and disposal.

In addition to the foregoing, the extracted crude oil commonly includes a certain percentage of suspended solid contaminants particularly such as inorganic sand or clay particles having hydrocarbon molecules adhered thereto. To avoid negative economic value attributable to the presence of these contaminants, settling tanks or ponds are often employed to allow at least some of the solid contaminants to settle to the bottom before the remaining crude oil is skimmed off for refining. The resultant sediment comprises a highly thick and viscous, almost solid petroleum-based sludge consisting of the solid contaminants such as sand or clay particles, which are coated with hydrocarbon molecules adhered thereto. This tank sludge is very difficult to fluidize and remove from the bottom of a settling tank or pond, and, once again, requires exposure of workmen to toxic materials and dangerous working conditions, and further represents a highly toxic waste product.

The above-described petroleum sludge products typically include heavy organic molecules such as paraffin/wax, resin, asphaltene, diamonoid, mercaptans, and organometallic compounds. As noted above, such organic compounds can be carried with the crude oil and precipitate out at various stages of the petroleum production process, resulting in sludge accumulation within tanks and/or blockages within pumps, valves, pipelines, and other handling and processing equipment. Various intermolecular and interparticle forces are responsible for such precipitation and deposition, and the deposited particles can stick or adhere to the wall of almost any equipment contacted therewith. The toughness of the precipitate and its behavior depend largely upon the presence of asphaltene and/or paraffin/wax in the crude oil. Asphaltene, which is a highly polar compound that is insoluble in aliphatic hydrocarbons from crude oil, is present in the form of relatively stable colloidal particles. When destabilized during production or processing, asphaltene can deposit onto contacted surfaces as a "glue and mortar" type precipitate, resulting in hardening other components of the crude oil to form extremely viscous and virtually solid sludge deposits. When such deposits are combined with highly polar solid contaminants such as sand and clay particles, the virtually solid character of the sludge deposit is enhanced.

Wax present in crude oil forms deposits due to different reasons. Petroleum wax consists primarily of linear paraffin hydrocarbons (C18-C36) and naphtenic hydrocarbons (C30-C60), and such hydrocarbons of wax can exist in either liquid amorphous pumpable state or solid crystalline form. Wax/paraffin may deposit due to lowering of crude oil temperature and phase transformation from liquid amorphous into crystalline solid form. Wax crystallization is influenced by the presence of asphaltene and sand. Such complex mixtures often form deposits that cannot be re-fluidized by simple reheating of the system or by the introduction of aromatic solvents.

Accordingly, heretofore, a satisfactory integrated, economical, effective and efficient, and relatively environmentally compatible system and method have not existed for dealing with these petroleum-based sludge problems. Instead, current systems and methods have relied upon a variety of chemical and mechanical methods which expose workers to very toxic and dangerous conditions and chemicals, and often significantly increase the amount of a waste stream that contains hazardous materials and is thus subject to complex and costly disposal methods. In addition, current solvent-based chemical compositions used to remove and/or clean heavy oil, oils from tar sands, and residual down-hole sludge in a well are often very expensive yet offer minimal if any success.

There exists, therefore, a significant need for improvements in and to systems and methods for recovering heavy and/or viscous petroleum, for fluidizing petroleum-based sludge formations, for cleaning accumulated sludge and tar formations from surfaces of petroleum processing equipment, and for separating petroleum hydrocarbon molecules from solid contaminants such as sand and clay, all to permit and facilitate substantially optimized petroleum recovery and to provide a substantially clean solids by-product which can be disposed or subjected to alternative uses in an environmentally safe and friendly manner. The present invention fulfills all of these needs, and provides further related advantages.

SUMMARY OF THE INVENTION

In accordance with the invention, an improved system and process are provided for recovering hydrocarbon-based sludge and heavy, relatively viscous oil in a variety of petroleum industry applications, thereby enhancing petroleum recovery and production. In addition, the system and process of the present invention may be used for separating accumulated oil-based sludge coatings from process equipment surfaces in a manner that effectively prevents or minimizes subsequent sludge accumulation thereon. Further, the invention provides an effective system and method for separating and cleaning suspended solid contaminants such as sand and silt particles to provide an oil product of improved quality, and a separated solids by-product which can be used or disposed in a environmentally compatible manner.

In the preferred form, the system and process comprises contacting the sludge or heavy oil with a negatively charged aqueous dispersion fluid, preferably under relatively high pressure and high shear conditions. A preferred dispersion fluid comprises at least one alkalinity or negative charge building agent such as sodium metasilicate in water. These charge-building agent or agents are present in an amount sufficient to achieve a final solution pH within a range of from about 11 to about 13. In one preferred form, sodium metasilicate is provided in water at a concentration of from about 0.05% to about 10.0% by volume, and preferably about 1.0%, to achieve a final solution pH on the order of about 11.4. Sodium hydroxide can be added to the solution to increase the final pH level, such as addition of about 0.5% sodium hydroxide by volume to achieve a final pH of about 12.5. Additional conditioning agents such as surface tension lowering agents, e.g., nonionic surfactants, and demulsifiers such as pine oil and other terpene hydrocarbon derivatives and the like may also be used in trace amounts.

The dispersion fluid comprises a non-toxic, non-solvent based, and environmentally friendly solution, which effectively fluidizes the petroleum sludge or heavy oil deposit. In general, the specific final pH of the dispersion fluid is directly proportional to the viscosity of the sludge or heavy oil deposit, i.e., a higher pH level facilitates fluidization of more viscous petroleum products. The dispersion fluid is injected under relatively high pressure and high shear conditions into contact with the sludge material, resulting in separation of the petroleum-based constituents from inorganic surfaces such as process equipment surfaces and inorganic solids such as sand and silt particles. Separation of these constituents may be enhanced by additional mechanical means such as by applying sonic or ultrasonic vibration, or hydroblasting, and the like.

The surface area of the inorganic constituent (process equipment surface, or solid contaminant such as sand or clay particles) is thus effectively stripped free of hydrocarbon molecules adhered thereto, and the negatively charged dispersion fluid is believed to reverse the positive or neutral ionic charge of the inorganic surface area so that subsequent re-adherence or re-attachment of hydrocarbon molecules thereto is effectively resisted. Some of the petroleum constituent is also believed to adsorb the dispersion fluid and thereby assume a negative ionic charge for improved separation from the inorganic constituent. This technique effectively reduces the viscosity of the petroleum constituent to an easily recoverable fluidized state, which is independent of temperature.

In one form, the mixture or slurry of fluidized petroleum, solids contaminants, and dispersion fluid is settled within a settling tank, wherein the petroleum product floats to the top while particulate settles to the bottom as sediment. The dispersion fluid remains generally within a central or mid-level region of the settling tank where it can be removed for re-use. The fluidized petroleum product can be removed as by skimming for processing by conventional refinery methods, and thus represents a recovered, otherwise waste or unusable petroleum resource. This particulate sediment such as sand and clay particles can be separated from the fluidized petroleum product can be recycled for alternative uses such as incorporation into paving compositions, or disposed downhole or in a landfill or the like, all in an environmentally friendly manner.

The system and method can be utilized for in situ fluidization of in-ground petroleum deposits including sludge accumulated in the region adjacent a well-head, or accumulated upon process equipment surfaces such as pumps and valves and the like, thereby improving oil field production. The invention may also be used for fluidizing and recovering petroleum sludge collected within settling tanks or waste ponds, and/or for separating the petroleum sludge component from the inorganic solid component for independent reclamation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a process flow chart illustrating the petroleum recovery and cleaning system and process of the present invention, for use in recovering and cleaning petroleum-based sludge accumulated within the bottom of a settling or storage tank or the like;

DETAILED DESCRIPTION OF THE PREFERRED EMBODIMENTS

As shown in the exemplary drawings, the present invention is directed to an improved system and method for recovering and/or cleaning residual or waste petroleum products such as sludge accumulated within a storage tank or upon process equipment surfaces, or from inorganic materials such as sand or clay, and the like. The invention utilizes an environmentally safe and biodegradable, aqueous-based, organic solvent-free, and negatively charged dispersion fluid, which is contacted with the petroleum product under controlled relatively high pressure and high shear conditions. As a result, hydrocarbon molecules are fluidized and separated from adherence with process equipment surfaces, or contaminants such as sand or clay. Additional mechanical separation as by subjecting the mixed petroleum product and dispersion fluid to sonic vibration or hydroblasting may also be employed. The thus-fluidized mixture or slurry of petroleum products, dispersion fluid, and inorganic materials can be separated by conventional techniques, as by settling, for further individual processing and/or re-use.

In general, recovery and/or cleaning of petroleum-based sludge and heavy oil products poses a number of problems in the petroleum industry, ranging from subterranean clogging or obstruction of flowable crude oil within a working oil field to an extraction pump or well-head, to coating and clogging of process equipment surfaces such as pump and valve surfaces as well as pipeline and reservoir surfaces, and further to accumulation of petroleum-based sludge sediment within settling tanks and waste ponds used to separate undesirable crude oil constituents from higher grade constituents having a higher commercial value. In addition, some extracted oil deposits include a significant proportion of suspended solid contaminants such as inorganic sand and clay particles and the like which negatively impact commercial value. Recovery and/or cleaning of such sludge and heavy oil products has generally required the use of costly and toxic materials such as volatile solvent-based cleaning solutions which thus expose workers to toxic and dangerous working conditions. Moreover, in many cases, attempts to recover and/or clean these sludge and heavy oil products have met with limited success.

In accordance with the system and method of the present invention, the dispersion fluid comprises a water-based and solvent-free solution designed for chemically and mechanically separating hydrocarbon molecules from adherence with inorganic surfaces, such as process equipment surfaces formed from metal or the like, or other inorganic surface such as subterranean rock strata, or suspended sand and clay particles and the like. The dispersion fluid effectively fluidizes the petroleum-based sludge or heavy oil so that these materials can be separated and recovered. In addition, the negatively charged dispersion fluid beneficially conditions the inorganic surfaces for substantially reducing or preventing subsequent accumulation or build-up of sludge deposits or coatings thereon.

In one preferred form, the negatively charged dispersion fluid comprises at least one alkalinity or negative charge building agent, such as sodium metasilicate in water. These charge-building agent or agents are present in an amount sufficient to achieve a final solution pH within a range of from about 11 to about 13. In a preferred working embodiment of the invention, sodium metasilicate is provided in water at a concentration of from about 0.05% to about 10.0% by volume, and preferably about 1.0%, to achieve a final solution pH on the order of about 11.4. Sodium hydroxide can be added to the solution to increase the final pH level, such as addition of about 0.1% to about 10% by volume, and preferably about 0.5%, sodium hydroxide by volume to achieve a final pH of about 12.5. Additional conditioning agents such as surface tension lowering agents, e.g., nonionic surfactants, and demulsifiers such as pine oil and other terpene hydrocarbon derivatives and the like may also be used, such as pine oil in the range of from about 0.01% by volume to about 10% by volume, and preferably about 1.0%, or soybean oil in the range of from about 1% by volume to about 20% by volume. In general, the specific final pH of the dispersion fluid is directly proportional to the viscosity of the sludge or heavy oil deposit, i.e., a higher pH level facilitates fluidization of more viscous petroleum products.

The thus-formulated dispersion fluid is injected under relatively high pressure and high shear conditions into contact with the sludge or heavy oil material to be fluidized, recovered, and/or cleaned from one or more inorganic surfaces or suspended constituents. The specific dispersion fluid injection pressure may vary considerably, depending upon the particular working environment.

Importantly, metasilicate ions and hydroxide ions within the dispersion fluid are believed to adsorb at inorganic surfaces and at the surfaces of some essentially solid organic materials such as asphaltenes, for negatively charging such surfaces. These negative charges build repulsive interparticle forces needed to lower the viscosity and adhesion forces. As a result, inorganic, particles such as suspended sand and clay and organic deposits such as asphaltenes, with adsorbed metasilicate ions, become highly polar and transfer into the water phase of the dispersion fluid. In addition, process equipment surfaces including adsorbed metasilicate ions build repulsive forces at such surfaces to cause hydrocarbon molecules to separate therefrom, with the negative charge thereafter functioning to protect such surfaces against re-adherence of hydrocarbon molecules as well as providing an effective corrosion inhibitor.

Sodium metasilicate and sodium hydroxide are available in powder or solution form from numerous sources, for use in preparing the dispersion fluid of the present invention. Dissolution of such agents in water is fast and easy. Persons skilled in the art will recognize and appreciate that alternative alkalinity or charge-building agents may be used, such as carbonates, bicarbonates or phosphates alone or in combination, but are less preferred than sodium metasilicate.

When necessary (heavy oil solubilization, tar sand solubilization, and soil/sand washing), surfactants and polymers are sometimes beneficially added to the dispersion solution to reduce surface tension, to enhance the dispersability of oil, and to increase repulsive forces between various surfaces in contact, i.e., such as an oil/sand and/or oil/metal surface system. A known phenol-based nonionic surfactant may be used for this purpose, such as Triton X100 available from Union Carbide, Danbury, Conn. However, such surfactants are not biodegradable and their usage sometimes generates undesirable by-products.

Alternative alkoxylated nonionic surfactants, which are devoid of phenolic compounds, are more preferable and are best capable of improving the detersive action of the alkaline metasilicate dispersion solution to provide for ready fluidization of petroleum sludge and heavy oil, and for subsequent separation of contaminants from aqueous solutions in order for the dispersion fluid to be re-used or recycled. In general, such alkoxylated nonionic surfactants include ethoxylated alcohol, ethylene oxide-propylene oxide block copolymers, ethoxylated-propoxylated alcohols, alcohol alkoxylate phosphate esters, ethoxylated amines, and alkoxylated thioesters are believed to be useful surfactants in the dispersion fluid of the present invention.

Examples of such alkoxylated ethylene oxide-propylene oxide products are available from BASF Corporation, Florham Park, N.J., under the name Pluronics. Also useful are alkoxylated alcohols available from Olin Corporation, Clayton, Mo., under the name Polytergent SL, and from Shell Chemical Co., Houston, Tex., under the name Neodol. Polyoxyethylene condensates of sorbitan fatty acids, alkanolamides, such as monoalkanolamides, dialkanolamides and amines and alcohol alkoxylate phosphate esters, such as the series of products marketed by BASF Corporation under the name Klearfac are also useful. Other useful surfactants are those derived from N-alkyl pyrrolidone, as described in U.S. Pat. No. 5,093,031, which is incorporated by reference herein. Alkoxylated thiol surfactants are particularly efficient in aiding removal of oil from metal surfaces in tanks, with one such surfactant being available from Rhone Poulene Corporation, Bridgewater, N.J., under the name Alcodet 260. Polymeric surfactant demulsifiers such as resin alkoxylates, modified polyols, polyols, resin ethoxylates or polyimine alkoxylates such as those available from Uniqema Corporation, New Castle, Del., under the name Kernelix series may also be used.

When particularly viscous petroleum samples are encountered, addition of anionic surfactants such as sodium dodecyl sulfate or fatty acids (oleic acid) can be useful, at a concentration range on the order of from about 1% to about 10% by volume. Mixtures of anionic—nonionic surfactants adsorb efficiently at the inorganic surfaces, which is quite useful in surface charge building as described above.

Natural mixtures of biodegradable anionic and nonionic surfactants may also be employed, such as pine oil and other terpene hydrocarbon derivatives and the like, and soy oil, and mixtures thereof.

Surfactants and oils mentioned above can be used at concentrations ranging typically from about 50 mg/L to about 10%. Since every petroleum deposit and related recovery and/or cleaning application can be unique, routine field testing is required to determine the optimum concentration to achieve the desired result. Such routine field testing is well known and understood by persons skilled in the art, including standardized ASTM tests.

Additional conditioning agents may be added as needed to the dispersion fluid solution. For example, antiscaling polymers may be included to prevent extensive precipitation of magnesium or calcium salts when hard water or salty water is used. As one example, carboxylic small molecular weight polymers available from Cytec Industries, Stamford, Conn., under the name P70 may be used.

When fluidized oil and solid particles are present in emulsified form, demulsification chemicals may be used to facilitate oil-water separation. One preferred class of polymeric demulsifying agents comprises cationic coagulants such as quarternary polyamines or polyDADMAC's available from Cytec Industries under the names C-581 and C-595, respectively. To further enhance flocculation of fine particles and demulsification, large molecular weight cationic polyacrylamides may be used, such as available from Cytec Industries under the name C-498. Such chemicals are used at concentrations between about 10 ppm and 500 ppm, as optimized in standardized jar flocculation tests of the type known to those skilled in the art.

It is also noted that the dispersion fluid as described above uses metasilicate ions at concentrations much lower than a solution wherein silicate ions are used to achieve a comparable alkalinity. As a result, it is possible to use mixtures of fresh water and Sea water to prepare the dispersion fluid of the present invention. This is particularly useful in oil platform or coastal oil remediation applications.

Crude sludge, laden with heavy waxy paraffin and asphaltenes, has typically represented the greatest challenge for petroleum recovery and/or cleaning processes. This waste stream is problematic in production tank crude waste streams, down-hole well bores, and production pipelines. In the past, this waste stream has been treated with diluents such as diesel oil as part of a blending process intended to enable material flowability and transfer. However, hydrocarbon solvents such as diesel oil have a comparably low molecular weight and are therefore particularly volatile. Such volatile organic solvents release toxic vapors that are dangerous to worker health and safety. Such fuel oil waste streams, when insufficiently blended with low molecular weight organic solvents, will eventually return to a waxy nonflowable or unpumpable condition as the organic solvent vaporizes. Such technique for managing this waste stream is costly and problematic. The present invention provides an effective and safe system and process for managing this waste stream.

The following examples and tests will serve to illustrate the application, breadth and scope of the present invention:

EXAMPLE 1

The system and process of the present invention are useful in fluidizing petroleum-based sludge accumulated at the bottom of a settling or storage tank of the type commonly used in a refinery facility, to permit solid contaminants and the like to fall out of suspension and accumulate at the tank bottom as a sediment in the form of a heavy, petroleum-based and almost solid waste product. Following an appropriate settling interval, the resultant clarified and more viscous oil product within an upper region of the settling tank is skimmed off for appropriate refining processes.

The objective of the present invention is to economically remove and dispose of this petroleum-based sludge, which may comprise on the order of about 3,500 barrels (bbls.) of accumulated material at the bottom of a typical refinery storage/settling tank having an overall petroleum storage capacity on the order of about 100,000 bbls., in a manner consistent with minimal disruption of refinery operations, and in an environmentally sensitive manner. In general, the dispersion fluid is prepared and contacted with the sludge material following removal of the overlying clarified and more viscous oil product. The dispersion fluid effectively fluidizes the otherwise heavy and highly viscous sludge material, so that it can be transported as by pumping to appropriate process equipment. In this exemplary test of the invention, the dispersion fluid is injected into the tank as by direct worker access using pressure hose equipment.

More particularly, aqueous dispersion fluid including about 0.5% sodium metasilicate was used. In particular, sodium metasilicate available in solid form from PQ Corporation, Valley Forge, Pa., under the name Metso Pentabead 20 was mixed in water with high shear mixers. The resultant dispersion solution is hydrated and ready to use within 20 minutes. The volume of the dispersion fluid was about 16% of the volume of the resultant composite or fluidized sludge product stream. The thus-prepared dispersion fluid was then pressurized with a standard hydroblasting unit at pressures from about 1,200 psi to about 5,000 psi, with an average pressure level of at least 3,000 psi, and delivered via a spray nozzle into contact with the accumulated sludge material at a flow rate of about 6 to 12 gallons per minute. The tip of the spray nozzle at the end of the pressure hose was placed in close proximity with the sludge material, and, to the extent possible, inserted a short distance into the sludge material.

The foregoing process was applied to a typical refinery storage/settling tank as described above, and continued for 12 days over working shifts of about 8 hours per day. The dispersion fluid promptly fluidized contacted sludge material, and the thus-fluidized material was drawn off immediately by pumping into a succession of vacuum trucks. Each vacuum truck had a capacity to produce about 27 to 28 inches of water column vacuum, and had a capacity of about 110 bbls. Approximately 350 bbls. of fluidized sludge mixed with the dispersion fluid were removed from the tank during each 8 hour shift. This mixed fluidized composite contained about 84% petroleum-based sludge material and about 16% dispersion fluid.

This mixed and fluidized composite material was transported by the vacuum trucks to refinery coker processing equipment, where the fluidized mixture was unloaded into temporary storage tanks. For this particular application of the invention, the fluidized sludge material was successfully processed through the coker equipment, thereby resulting in commercial recovery of the petroleum-based material. Separation of the dispersion fluid from the fluidized sludge material was unnecessary, but, if required, such separation could be performed by means of centrifuge or standard sedimentation clarifiers.

EXAMPLE 2

In an alternative exemplary test of the invention, accumulated petroleum-based sludge is again removed from the bottom of a refinery storage settling tank, similar to the test described in Example 1 above, but without direct worker access to the tank interior. Accordingly, in this Example 2, workers were not subjected to the potentially toxic atmosphere within the tank interior. The storage/settling tank had a diametric size of about 90 feet, and included about 5,700 bbls. of accumulated petroleum-based sludge in sludge dunes ranging from about 4 to 6 feet in height. In this particular test, the accumulated crude oil sludge included a significant volume of suspended sand particulate and some proprietary catalyst, resulting in heavy oil deposits that would be very difficult to remove.

In this test, the dispersion fluid (prepared as described in Example 1, with a sodium metasilicate concentration of about 0.1%) was injected into the tank interior at a flow rate of about 6 gallons per minute, and an injection pressure at about 3,500 psi by means of an injection nozzle mounted at the end of an elongated wand fitted through a standard drain valve port mounted typically at the tank periphery near the bottom. The wand included a rigid aluminum recovery pipe (6 inch diameter) for vacuum drawing of fluidized sludge material mixed with dispersion fluid from the tank.

The action of vacuuming the fluidized sludge material and dispersion fluid through the recovery pipe applied the necessary shearing action to assist in fluidizing the otherwise non-pumpable sludge material, and to maintain this fluidized material including suspended solids in a sufficiently flowable state for vacuum extraction from the tank. In the absence of workers within the tank for moving the pressure nozzle into close proximity with yet-fluidized sludge material, movement of the pressure nozzle is limited yet periodic displacement thereof in combination with the shearing vacuum action effectively fluidized the sludge material.

The fluidized mixture comprising the sludge material entrained within the dispersion fluid was drawn into a succession of vacuum trucks as previously described for transfer to suitable, approximate 500 bbl. temporary storage. tanks, from which this material was subsequently transferred to and processed through a conventional coker unit in a refinery facility. The fluidized mixture was sufficiently pumpable to permit concurrent loading and unloading of the vacuum trucks without requiring tedious and time consuming washing and cleaning of truck tanks and related valves and other pumping equipment. The accumulate sludge material within the storage/settling tank was fluidized and removed in 26 days, and then passed inspection for return to service in less than one month.

EXAMPLE 3

In some instances, there is minimal commercial interest or opportunity in processing fluidized petroleum-based sludge material recovered as described, i.e., in Examples 1 and 2 above. In that event, economic and preferably environmentally compatible disposal represents another preferred option. Accordingly, as one application of the present invention, fluidized sludge material can be disposed by pumping such material down-hole into an exhausted or otherwise abandoned oil well, as opposed to traditional yet costly landfill disposal.

In this example of the invention, petroleum-based sludge material including very viscous asphaltene rich sludge, sand and clay was fluidized in the manner and using the dispersion fluid as described above in Example 1. Such sludge material was successfully removed from refinery storage tanks into vacuum trucks, transported to an abandoned well site, and then pumped or injected down-hole for disposal. Volatile hydrocarbon material was substantially completely removed from the storage tanks.

EXAMPLE 4

The system and process of the present invention may also be used to remove, or recover or extract, oil products from tar sands or other sand, soil and inorganic surfaces to which the hydrocarbon molecules are otherwise firmly adhered. Enhanced and cost-efficient oil production and recovery results, in combination with effective cleaning of the inorganic material so that it can be re-cycled or used in other applications.

In this example of the invention, a laboratory test was conducted to remove bitumen oil from oil sands in the Athabasca region of Alberta, Canada. 200 grams of oil sand material was mixed with 400 grams of dispersion solution prepared by dissolving about 1.0% sodium metasilicate in tap water together with addition of about 1% pine oil. This dispersion fluid or solution was mixed with the oil sand material in a laboratory mixer Model L4RT, obtained from Silverson Corporation, East Longmeadow, Mass., at about 6,000 rpm for about 60 seconds, without external application of heat. This mixing step provided thorough contact between the dispersion fluid and the oil sand material, in combination with relatively high shear forces. During mixing, air was also in contact with the solution, thereby creating bubbles and foam which assisted in separation of oil and solid material.

After this mixing step, the components were allowed to stand and separate for about 15 minutes. Three layers were visible, namely, an upper layer of floating oil, clay and sand sediment at the bottom, and the dispersion fluid with some particulate and dissolved organics in between. These different layers or phases were collected and analyzed. About 21 grams (about 10.5% weight) of bitumen oil was recovered from the upper layer, which represented about 98% of the oil present in the initial 200 grams of tar sand specimen. While some oil remained within the clay and sand sediment, visual inspection and chemical analysis (pyrolysis) indicated that it was in the 0.05-0.25% range.

This test of the invention demonstrates important advantages, namely, successful extraction and recovery of hydrocarbon material without requiring external heat addition and further in the absence of organic solvents such as naptha, together with relatively low viscosity and thus easy pumpability and handling of the recovered oil. In addition, the mid-phase component comprising the dispersion fluid was almost completely clear of solids tailings. In this regard, current so-called Clark processes used in Canadian oil sand fields produces large amounts of emulsified clay-based tailings which represents an enormous hazardous waste stream with major environmental issues.

An additional benefit of the invention is that some sulfur can also be removed from recovered oil products. A standard gas chromatography (GC) and a mass chromatography (MS) analysis of organic sulfur content before and after tar sand conditioning with the dispersion fluid according to the present invention showed that sulfur content was reduced from about 15,000 ppm (average for 3 samples) to less than about 50 ppm.

EXAMPLE 5

The invention is also useful for recovering oil products, wastewater and inorganic particulate such as sand and clay particles and the like from mature fine tailings (MFT) of the type generated from petroleum extraction from oil sands, as by means of the above-referenced Clark process. In this regard, oil recovery from Canadian and other tar sand oil fields produces a large amount of emulsified fine tailings consisting of bitumen oil and clay particles. Such tailings are regarded as a hazardous waste and are currently deposited in large ponds with no treatment except for slow consolidation and/or sedimentation. In some instances, gypsum is added in experimental efforts to increase the sedimentation rate of clay particulate.

In this example of the invention, a laboratory procedure achieved bitumen oil extraction and clay sedimentation in a relatively rapid and economical manner, without requiring input of external heat or the use of organic solvents. 200 grams of MFT, containing about 30% clay particulate, was mixed with about 400 grams of dispersion solution comprising about 0.5% sodium metasilicate and about 1% pine oil. These components were mixed and sheared in a Silverson Corporation mixer, model L4RT, at about 6,000 rpm for about 60 seconds. After mixing, the components were allowed to stand and separate for about 15 minutes. The bitumen oil was floating on top, whereas clay and silt particles sedimented on the bottom. The dispersion fluid and wastewater from the tailings comprised a middle level layer or phase.

Importantly, the residual bitumen oil in the upper layer (about 3.35% of the total composition) represented a virtual 100% recovery of oil. The clay sediment settled to the bottom in about 15 minutes as noted above, after being held in suspension in the waste tailing pond for about 20 years. Virtually 100% sedimentation of the clay particles is achieved in settling times somewhat longer than 15 minutes, such as a settling time for ultra fine clays on the order of about 48 hours.

As one alternative form, the dispersion solution can be prepared using brine water or Sea water, alone or in combination with fresh water, resulting in an increase in the ionic strength of the dispersion solution. Such increase in dispersion fluid ionic strength beneficially increases the speed of sedimentation of clay and other suspended particles, while also reducing fresh water requirements and utilizing Sea water—a resource commonly available at or near many oil field sites.

For use on a production scale, high shear mixers for large scale operations are known in the art, and are available from multiple sources, such as Silverson Corporation. Mixing and sedimentation of heavy particulate, and floatation of separated oil product can be accomplished with equipment such as an air sparged hydrocyclone or other modifications to liquid hydrocyclone technology. Such devices are also known to persons skilled in the art. Post-mixing separation of oil product, dispersion fluid, and sedimented particles can be achieved by means of clarifiers or flotation devices also known to persons skilled in the art. Accordingly, scale-up of the processes described in Examples 4 and 5 is within the scope and knowledge of persons skilled in the art.

EXAMPLE 6

Crude oil waste ponds may be cleaned and residual oil product recovered therefrom, following the system and process of the present invention. In this regard, a variety of petroleum production wastes are commonly deposited in waste ponds, e.g., sludge removed from production tanks, drilling mud, and similar waste solutions that are pumped into and stored within waste ponds. When a waste pond reaches a filled or substantially filled condition, it is necessary to remove the potentially hazardous and toxic petroleum-based material which might otherwise adversely impact the surrounding environment as by leaching into the subterranean water table or the like.

In this test, a petroleum sludge sample was collected from a waste pond located in Southern California. Upon analysis, the sludge sample was highly viscous and contained asphaltenes, sand, clay and other solids. The constituents comprised about 60% oil product (including about 16.2% asphaltene and about 1.6% paraffin), about 12% solids, and about 28% water. Pursuant to current treatment and processing methods, this material is generally considered to be untreatable.

About 200 milliliters (ml) of this sludge sample were contacted with the dispersion solution comprising about 1% by volume sodium metasilicate and about 3% pine oil in a beaker. Mixing and shear forces were applied by ultrasound for about 20 minutes, using an ultrasonic device available from Telsonic USA, Bridgeport, N.J., as Model No. RS-36-30-X. An ultrasonic resonator was inserted and into and generally centered within the beaker, with a lower end of the resonator spaced about 25 mm from the beaker bottom. The sludge sample was substantially and thoroughly fluidized within the dispersion fluid within about 20 minutes. Thereafter, the mixed components were allowed to stand and settle for about 15 minutes, resulting in substantial separation into an upper oil-based layer, a middle dispersion fluid layer of phase, and solid sediment at the bottom.

The oil-based upper layer was tested on a bench top centrifuge and standard procedures were used to measure bottom sediment and water content (BS&W). Water content in this oil-based layer was zero, and about 2% sediment was present. This oil-based upper layer exhibited a sufficiently and permanently low viscosity for easy pumping.

Once again, this laboratory test can be scaled up for large production rates, within the range and scope of persons skilled in the art. For example, high rate ultrasound processing devices are available from manufacturers such as Tech-Savants, Inc., Wheaton, Ill., having a process flow-through rate of up to about 1,000 gallons per minute. Heat generated inherently from such ultrasound systems beneficially enhances the fluidization process. In this regard, in the event that the process fluid temperature exceeds about 70° C., cooling devices may be incorporated to control and prevent excess heating.

In such large scale application, it may be appropriate to initially condition pre-condition the waste pond sludge by contact with the dispersion fluid, as by in situ hydroblasting or the like, to facilitate vacuum-draw recovery into a transport truck or the like, generally as described in Example 1. The thus-conditioned and mixed composite material can thereafter be subjected to ultrasound and shear treatment, as described above.

It is noted that the water composition of the sedimented solids can be further reduced by filtering under pressure, resulting in a modified sludge sample having reduced water content on the order of about 17%. Usually, it is very difficult to remove liquids from the clay and sand sediment, with at least 30% water remaining with the filtered solids. This means that significant savings can be achieved in terms of transportation and landfill costs, independent of using high mixers and/or ultrasound. The dispersion solution appears to be quite effective in separating the oil product from water and inorganic solids, and also appears to enhance dewatering of the solids. Such improved dewatering is believed to be enhanced further by improved coagulation attributable to adsorbed surfactants from pine oil.

EXAMPLE 7

In another exemplary test demonstrating the invention, a field study was performed to stimulate oil production from an existing oil well located in Signal Hill, California, wherein oil extraction had dropped to virtually zero. Instead, fluid extracted from the well consisted almost entirely of water. This existing oil well, referred to herein as well #1, was located adjacent a second still-producing well referred to as well #2.

To achieve enhanced production, acoustic energy was applied in combination with the introduction of the dispersion solution into the subterranean region surrounding the well bore area. Acoustic energy was used to apply mechanical shearing in sufficient quantity to clean out well casing perforations, to remove accumulated sludge and scale from well casing surfaces, to increase the mobility of heavy oils located in the subterranean strata in the vicinity of the well bore, and to apply a repulsive charge by acoustically shearing the dispersion solution onto the surrounding inorganics (metal well casing, sand, silt, clay, shale, rock, etc.) sufficient to release any organics (oil) from the strata while not allowing the oil to re-attach to thereto. The sonication application is designed to move laterally within the oil-bearing formation being stimulated while lowering oil viscosity and perhaps fracturing the formation. This is done with the objective of increasing overall oil production from the oil field over an extended period of time.

In this test, oil well #1 was prepared for field study by removing sucker rods, tubes, and pump from the well casing. Using a well head pumping truck, about 600 bbls. of dispersion solution was then injected through the well casing perforations under hydraulic pressure not exceeding 450 psi, at a depth ranging from about 2,650 to about 2,710 feet. This dispersion fluid was prepared by mixing blending 60 bbls. of concentrated dispersion solution consisting of about 20% sodium metasilicate and about 80% utility water at the well site with available production brine water, to yield a ready-to-use dispersion fluid having about 2% sodium metasilicate and an approximate 9:1 ratio of brine water to utility water.

Following down-hole injection of this dispersion fluid, the well casing was tested to confirm the absence of damage thereto in the course of the fluid injection step. Thereafter, sonic energy was applied to the subterranean strata along the well casing perforations. In this regard, application of sonic energy consists of (1) an actuator or transducer for converting electrical energy to mechanical, acoustic vibrations, (2) a horn for directing the mechanical energy or vibrations into horizontally transmitted acoustic energy waves, and (3) an AC power source with manual oscillator module. The actuator used in this Example 7 was a modified version of a Model AAO90J actuator from Etrema Products of Ames, Iowa. System power was controlled by a Titan series MAC-01S mainframe AC power source manufactured by Compact Power Co., of Yorba Linda, Calif. The sonication system was powered by two mainframe units, each capable of producing about 1,000 watts of output power that were connected in series to increase voltage and available power. Electrical power was provided by a field generator and a wire line truck was used to raise and lower the sonication device along the well casing for alignment with the perforations therein.

Various sonication frequencies were applied over a 2 day period along the well casing perforations. On day 1, about 90 minutes of sonication was applied at a frequency ranging from about 1012 Hz to about 1207 Hz, and at a power level ranging from about 70% to about 80% and averaging about 400 volts. On day 2, about 5 hours of sonication was applied at a frequency ranging from about 1017 Hz to about 1019 Hz, and at a power level of about 80% and averaging about 425 volts. The sonication device was then removed from the well casing. The well casing was then re-checked to confirm the absence of damage attributable to the sonication step, and the well (#1) was returned to production.

Oil production from well #1 and adjacent well #2 was monitored daily for a three month period following the dispersion fluid and sonication steps. This daily monitoring cycle was the followed by monthly monitoring of production logs for the two wells over a 2 year period, and then comparing the post-test production results with production logs for a one-year pre-test term. These results indicated that well #1 failed to show increased oil production, but adjacent well #2 showed a significant daily production increase of 14.6%.

Accordingly, it believed that more extensive dispersion fluid injection and sonication steps will yield predictably further increases in oil production from the oil field. In this regard, an active sonication device can be installed to remain within the well casing during normal production. Various dispersion solutions designed or tailored to mobilize specific heavy oil constituents such as paraffin/wax compounds and/or asphaltenes and other heavy oil obstructions can be routinely injected into the subterranean strata, thereby fluidizing more petroleum product for increased production, while cleaning and maintaining process surfaces such as well casings, pumps, valves, and the like of petroleum-based obstructions.

The system and process of the invention, as described above in connection with the foregoing Examples, is shown in more detail in the accompanying drawings.

Figure 1:
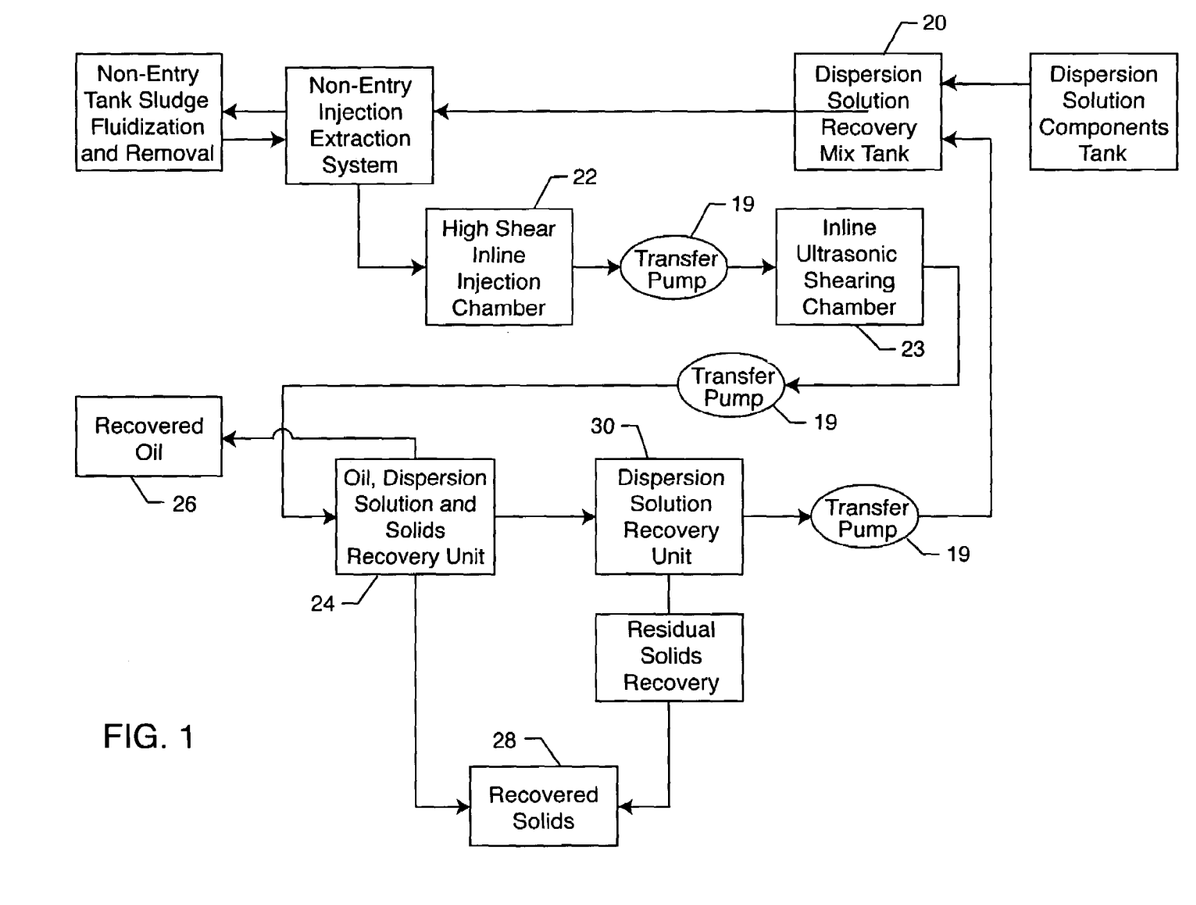
Figure 2:
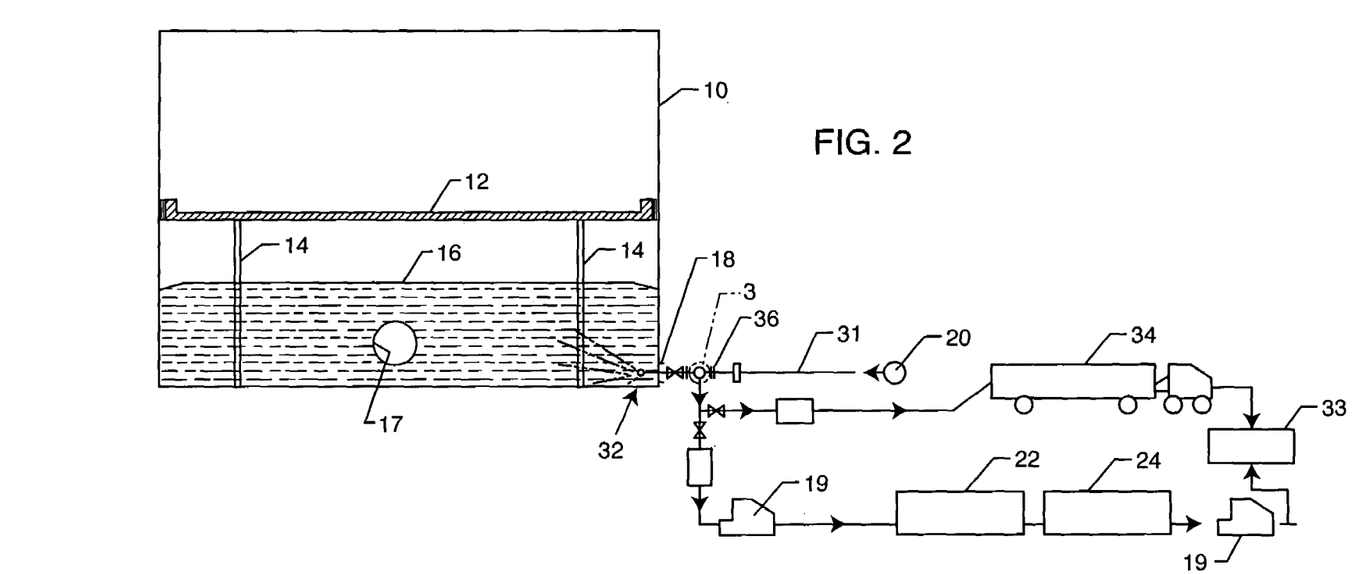
FIG. 2 is a somewhat schematic diagram illustrating injection of a dispersion fluid prepared in accordance with the invention into a settling or storage tank for contacting accumulated sludge therein, and vacuum withdrawal from fluidized sludge material from the tank.

More particularly, FIG. 1 generally illustrates a process flow chart for removing petroleum-based sludge from a settling or storage tank, as described in Example 2. In this regard, the tank 10 is shown in FIG. 2 of the type having a floating roof or cover 12 carried on support legs 14. Accumulated sludge 16 is depicted as sediment collected at the bottom of the tank. Multiple drain ports 18 and associated valve are typically provided about the tank perimeter near the base thereof. The sludge 16 is shown accumulated to a level higher than the drain ports 18 and also higher than a manway or hatch port 17 (FIG. 1) formed in the side of the tank 10.

The dispersion fluid may be prepared on site, as by mixing concentrated dispersion solution (as described in Example 7) with water (fresh and/or brine), and delivering the dispersion fluid to a solution recovery and mixing tank 20. From there, the dispersion fluid is injected through one or more of the drain ports 18 into contact with the accumulated sludge 16, for fluidizing the sludge. The fluidized mixture consisting of the sludge material and the dispersion fluid are drawn by appropriate transfer pumps 19 from the tank 10 in sequence through an in-line high shear injection chamber 22 and further through an in-line sonic or ultrasonic shearing chamber 23, for improved physical separation of hydrocarbon molecules from inorganic solids and the like. The fluid stream is directed further through a recovery unit 24 for separating the constituents into recovered oil 26, recovered solids 28, and recovered dispersion fluid 30 which can be recycled to the initial mixing tank 20 for re-use.

Figure 3:
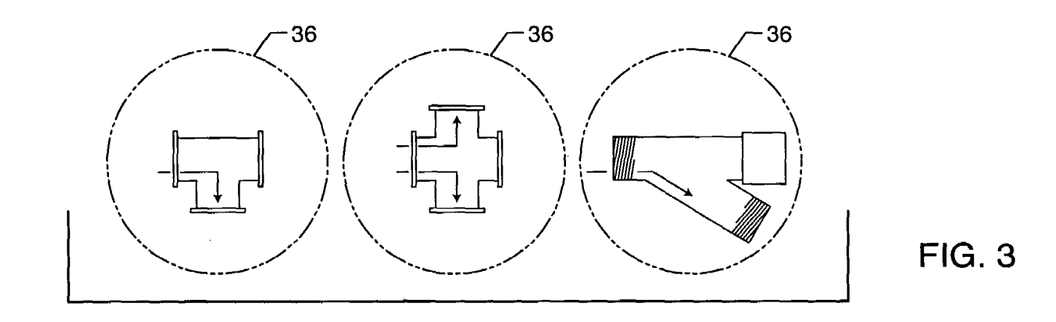
FIG. 3 is a somewhat schematic diagram showing alternative multi-port valves for use in the dispersion fluid injection and vacuum withdrawal steps depicted in FIG. 2.
Figures 4, 5:
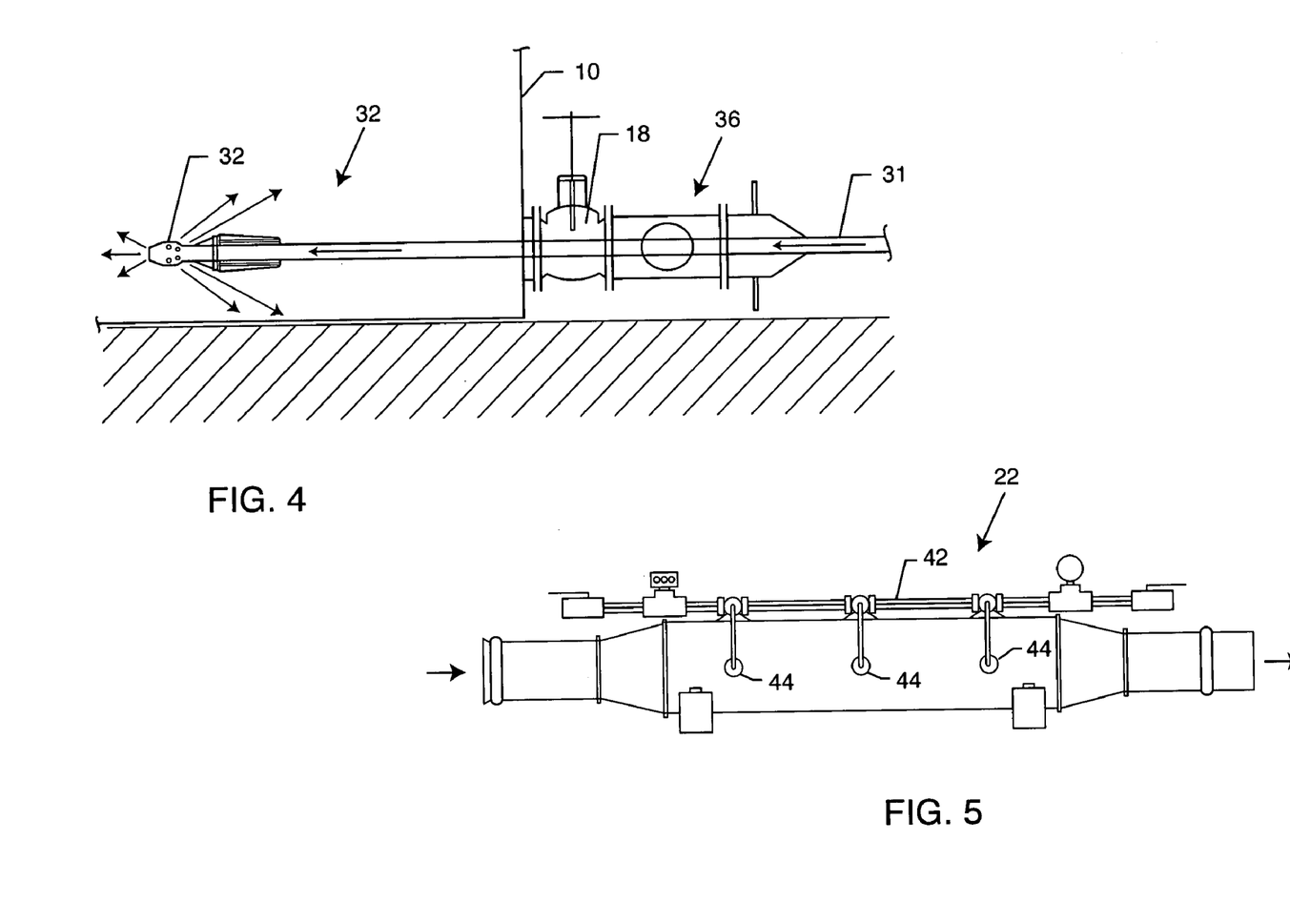
FIG. 4 is a somewhat schematic diagram depicting an injection nozzle unit for delivering the dispersion fluid into contact with the petroleum-based sludge within the tank.
FIG. 5 is a somewhat schematic diagram of a high shear in-line injection chamber for use in the cleaning system and process of the present invention.

FIGS. 2 and 4 show pressure injection of the dispersion fluid via one of the drain ports 18 (including a standard gate valve) into contact with the sediment sludge 16 within the tank 10. The dispersion fluid is introduced via an injection line 31 and a related injection nozzle unit 32 (FIG. 4) into contact with the sludge, preferably at a relatively high pressure on the order of about 5,000 to about 40,000 psi. The contacted sludge 16 is substantially immediately fluidized and may be removed as depicted by arrows 33 (FIG. 2) from the tank 10 as by vacuum pumping. FIG. 2 shows a vacuum truck 34 which can be used to transport the fluidized sludge material to a more convenient location for further processing in accordance with the flow chart of FIG. 1, ultimately for delivering recovered oil to refinery equipment such as a coker unit 33. In this regard, a multi-port spool or valve 36 is conveniently provided at the drain port 18 and may be used to accommodate pressure injection of the dispersion fluid and vacuum withdrawal of the relatively homogeneous fluidized sludge material via the same drain port 18 formed in the settling or storage tank 10. FIG. 3 depicts different potential configurations for this multi-port spool or valve 36. Importantly, the negatively charged dispersion fluid acts to condition surfaces of process equipment so that hydrocarbon molecules do not adhere thereto, whereby vacuum trucks can be quickly and easily off-loaded without requiring time-consuming or tedious wash-out and cleaning procedures.

As shown in FIG. 2, also depicts alternative direct vacuum-pumped flow of the fluidized sludge material as by means of transfer pumps 19 through the shear chambers 22 and 24. FIG. 5 depicts an illustrative in-line high shear injection chamber 22 wherein the fluidized sludge material is subjected to pressure injection of additional dispersion fluid at pressures up to about 40,000 psi, by means of an injection manifold 42 and associated injection nozzles 44. This high pressure shearing action assists in further separating hydrocarbons from solid materials by mechanical means. The high impact fluid blasting at this step in the process impacts particulates from multiple angles, thereby cleaning particulate surfaces while donating the negative charge to the solid particulate as they pass through the chamber. This in-line injection chamber can also be used to inject air to further disperse and expose the solids ahead of the dispersion fluid injection, or simultaneously. Such air injection can be utilized in-line prior to a cyclone separator unit to enhance oil, water, and solid separation throughout the cyclone process.

Although shown at a location outside the settling tank 10, persons skilled in the art will recognize that this high shear injection chamber 22 may be installed directly within the tank 10, if desired. In this regard, the objective is to thoroughly fluidize the sludge material 16 as quickly as possible, whereby positioning the injection chamber 22 close to the initial point of dispersion fluid contact therewith will enhance and facilitate rapid fluidization.

Figure 6:
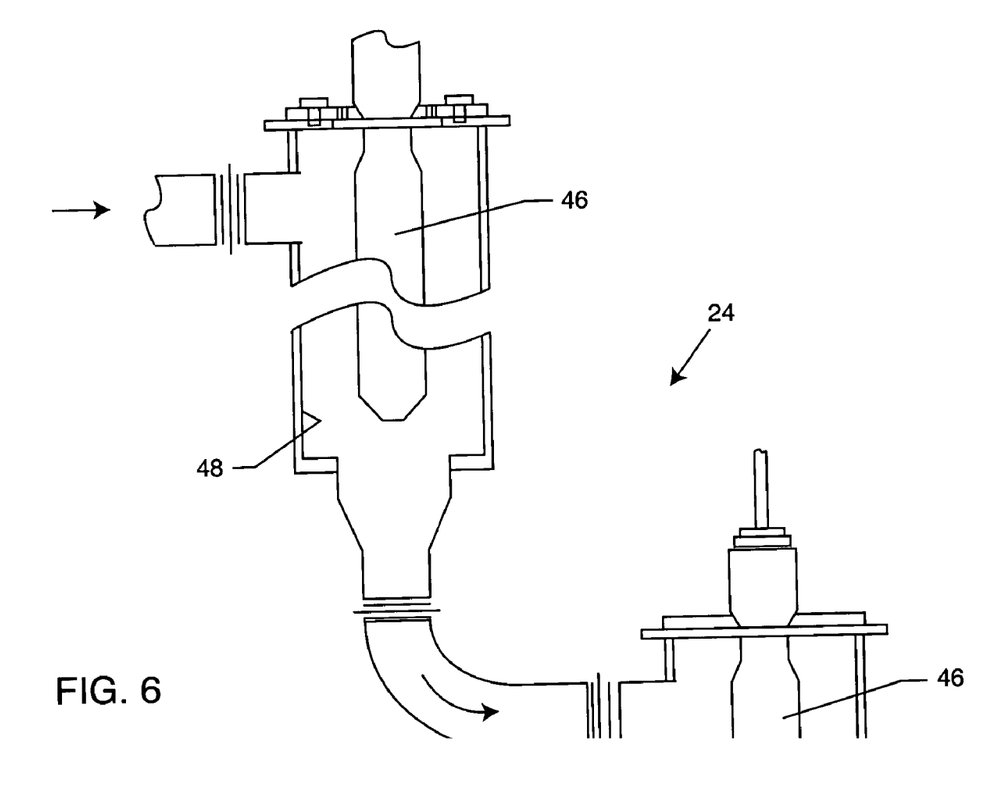
FIG. 6 is a somewhat schematic diagram of an in-line ultrasonic shearing chamber for use in the invention.

FIG. 6 depicts one preferred configuration for the ultrasonic shearing chamber 23. As shown, this component may comprise one or more ultrasonic or acoustic energy devices or probes 46 installed directly into a flow path 48 through which the fluidized slurry of dispersion fluid and sludge material is pumped. These acoustic energy devices 46 bombard the flow stream with ultrasonic or acoustic waves, resulting in a series of implosions and vibrations to further shear hydrocarbon molecules from the surfaces of inorganic solids and the like. FIG. 6 shows a pair of acoustic probes 46 mounted respectively in a pair of series-flow chambers for sequentially treating the fluidized slurry.

Figure 7:
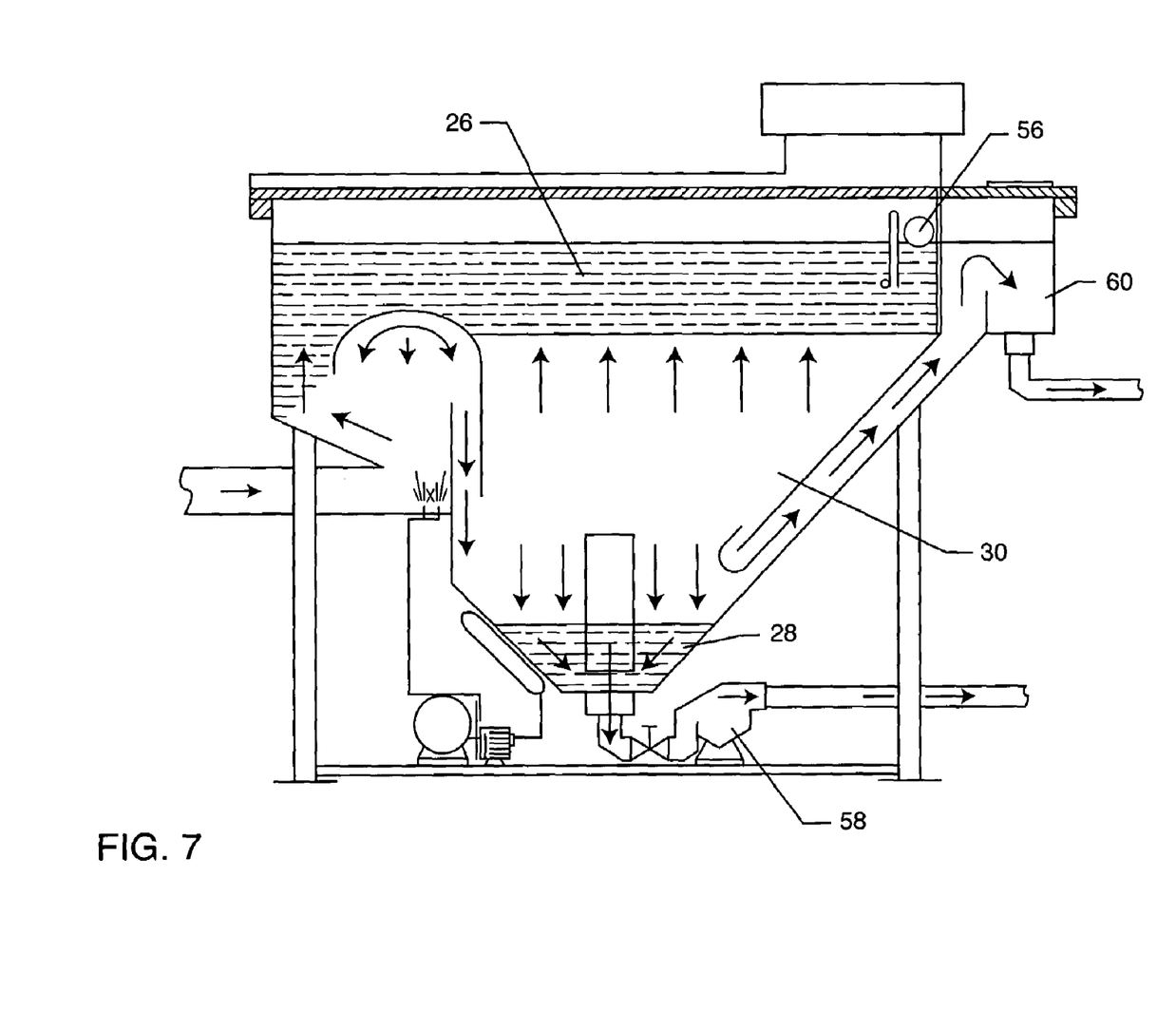
FIG. 7 is a somewhat schematic diagram of an oil, dispersion fluid, and solids recovery unit for use in the invention.

FIG. 7 shows an oil, dispersion fluid, and solids recovery unit 24, wherein separated hydrocarbon product 26 is shown floating to the top whereas heavy solids 28 are shown depositing at the bottom as sediment. The dispersion fluid 30 comprises an intermediate level or phase positioned in between. The fluidized slurry enters the recovery unit 24 via an inlet 49 which may incorporate an air sparger nozzle 50 for injecting air into the flow stream for further improved component separation. A downwardly concave deflector dome 51 within the recovery unit 24 may also be provided to deflect solids entrained in the flow stream, thereby assisting in solids precipitation. As shown, the hydrocarbon product 26 rises or floats to the top of the recovery unit 24 and can be drawn through an outlet 56 or the like for appropriate flow and/or transport to refinery equipment (such as a coker unit 33 depicted in FIG. 2) for further process and recovery to produce various commercial petroleum products. The sedimented solids 28, precipitation of which can be enhanced by a vibrator element 57 coupled to a lower region of the recovery unit 24, can be drawn off as by means of solid waste transfer pump 58 through a suitable outflow conduit 59 for environmentally acceptable use or disposal. Finally, the dispersion fluid 30 can also be drawn off as an effluent through an outlet 60 for recycling and re-use as viewed, for example, in FIG. 2. Alternately, if sufficiently contaminated from long-term use as described herein, the dispersion fluid 30 can be transferred to a clean water recovery system of a type known in the art, with waste effluent therefrom being typically disposed by down-hole well injection. Similarly, the recovered solids may also be disposed down-hole, if desired.

Figure 8:
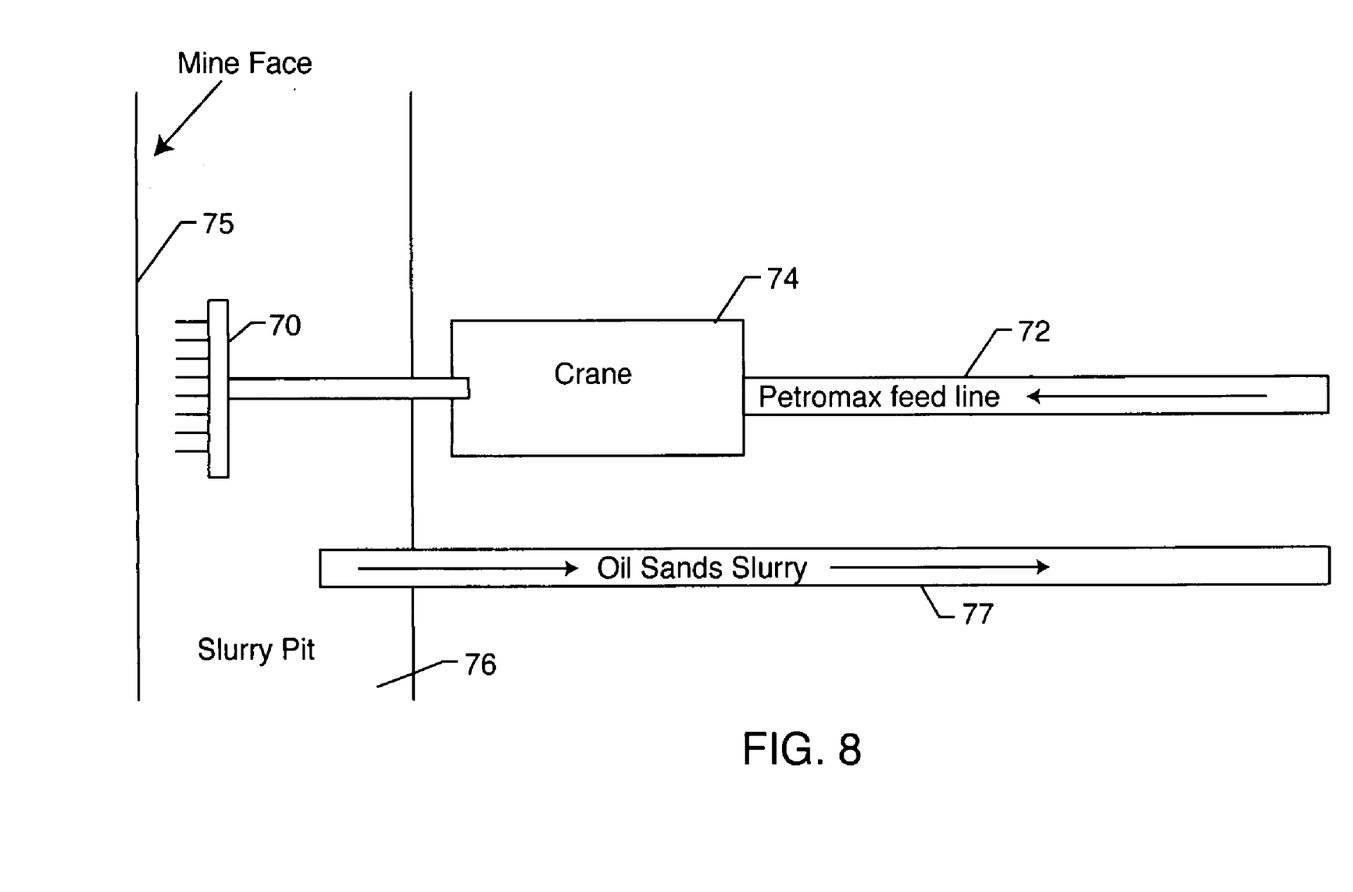
FIG. 8 is a somewhat schematic plan view diagram showing a hydroblasting process in accordance with the invention.

FIG. 8 shows use of the invention wherein the dispersion fluid is injected into contact with oil-bearing solids such as tar sands or the like, by means of a hydroblasting array 70. As shown, dispersion fluid prepared in accordance with the above described Examples is pumped under pressure through an injection line 72 to the hydroblasting array or unit 70. A crane 74 or other mobile device or component may be provided for movably directing the pressure-spray of dispersion fluid into contact with a mine face 75 or the like, such as a bank of tar-bearing sands or the like. Upon such contact, the combined oil-bearing and solids material is substantially immediately fluidized, typically for gravity flow into a slurry pit 76 from which the slurry can be vacuum drawn or pumped through a slurry line 77 or the like for further processing as described herein.

Figure 9:
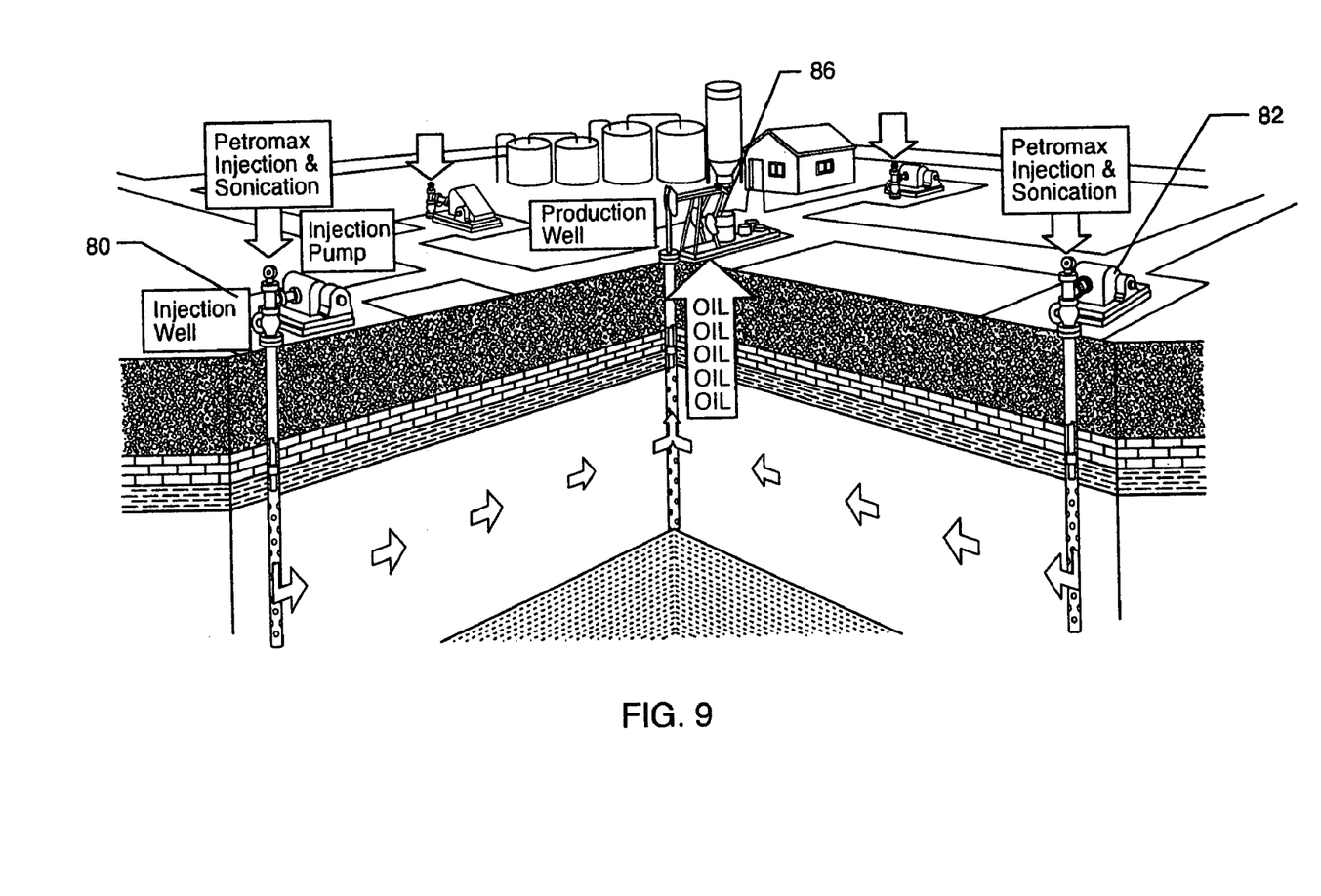
FIG. 9 is a somewhat schematic diagram illustrating use of the invention for stimulating production from an existing oil field.

FIG. 9 shows use of the invention for stimulating oil production from an existing oil field, by fluidizing underground sludge deposits and other heavy oils which otherwise tend to obstruct flow of less viscous recoverable oil to existing production wells. As shown, a pair of injection wells 80 and 82 are provided for down-hole injection of the dispersion fluid (prepared as described above) into the subterranean oil field. One or more of these injection wells 80 and 82 may also accommodate sonication as by the use of ultrasonic or other acoustic energy devices described herein with respect to Example 7. The injection wells may comprise existing production wells, such as wells that have become clogged and thus have encountered dramatically reduced production levels.

As depicted in FIG. 9, the combined use of the dispersion fluid and sonication effectively fluidized underground oil sludge deposits and the like for increasing overall oil field production. Such increased production may be realized by increased production from one or more adjacent production wells 86. In this regard, it will be recognized and understood that the injection wells 80 and 82 may be use intermittently or substantially continuously for dispersion fluid injection and/ or sonication over an extended period of time, or they may be returned to normal oil production.

Although several embodiments and specific examples of the invention have been described in detail for purposes of illustration, a variety of further modifications and improvement in and to the novel system and process may be made without departing from the scope and spirit of the invention. Accordingly, no limitation on the invention is intended by way of the foregoing description and accompanying drawings, except as set forth in the appended claims.

What is claimed is:

1. A petroleum recovery process, comprising the steps of:
   contacting a viscous petroleum product with an aqueous-based, negatively charged dispersion fluid to form a fluidized slurry having solid contaminants therein; and
   processing the fluidized slurry to separate and recover the petroleum product, solid contaminants and dispersion fluid therefrom as independent products;
   wherein said contacting step comprises the steps of injecting the dispersion fluid into contact with the petroleum product under relatively high pressure conditions to form the fluidized slurry, drawing the fluidized slurry through an injection chamber, and iniecting additional dispersion fluid into contact with the slurry within the injection chamber under relatively high pressure and high shear conditions.

2. The petroleum recovery process of claim 1 wherein the negatively charged dispersion fluid has a pH within the range of from about 11 to about 13 .

3. The petroleum recovery process of claim 2 wherein the negatively charged dispersion fluid has a pH within the range of from about 11.4 to about 12.5 .

4. The petroleum recovery process of claim 1 wherein the negatively charged dispersion fluid includes sodium metasilicate.

5. The petroleum recovery process of claim 4 wherein the negatively charged dispersion fluid further includes sodium hydroxide.

6. The petroleum recovery process of claim 1 wherein the negatively charged dispersion fluid includes sodium metasilicate at a concentration within the range of from about 0.05% by volume to about 10.0% by volume.

7. The petroleum recovery process of claim 6 wherein the sodium metasilicate concentration is about 1.0% by volume.

8. The petroleum recovery process of claim 6 wherein the negatively charged dispersion fluid includes sodium hydroxide at a concentration of about 0.5% by volume.

9. The petroleum recovery process of claim 1 wherein the negatively charged dispersion fluid further includes conditioning agents selected from the group consisting essentially of nonionic surfactants and emulsifiers.

10. The petroleum recovery process of claim 9 wherein said nonionic surfactants include pine oil at a concentration within the range of from about 0.01% by volume to about 10% by volume.

11. The petroleum recovery process of claim 10 wherein the pine oil concentration is about 1% by volume.

12. The petroleum recovery process of claim 9 wherein said nonionic surfactants include soybean oil at a concentration within the range of from about 1% by volume to about 20% by volume.

13. The petroleum recovery process of claim 9 wherein said nonionic surfactants are biodegradable.

14. The petroleum recovery process of claim 13 wherein said nonionic surfactants include ethylene oxide-propylene oxide products.

15. The petroleum recovery process of claim 1 wherein the negatively charged dispersion fluid further includes anionic surfactants.

16. The petroleum recovery process of claim 15 wherein the anionic surfactants comprise sodium dodecyl sulfate at a concentration within the range of from about 1% by volume to about 10% by volume.

17. The petroleum recovery process of claim 1 wherein said contacting step includes injecting the dispersion fluid into contact with the petroleum product under relatively high pressure, high shear conditions.

18. The petroleum recovery process of claim 17 wherein said contacting step comprises hydroblasting.

19. The petroleum recovery process of claim 17 wherein said contacting step comprises down-hole injection of the dispersion fluid.

20. The petroleum recovery process of claim 17 wherein said contacting step comprises injecting the dispersion fluid into a petroleum storage tank.

21. The petroleum recovery process of claim 17 wherein said contacting step comprises injecting the dispersion fluid at a pressure within the range of from about 5,000 psi to about 40,000 psi into contact with the petroleum product.

22. The petroleum recovery process of claim 1 further including the step of drawing the fluidized slurry from the injection chamber through a sonic shear chamber, and applying sonic vibration to the fluidized slurry within the sonic shear chamber.

23. The petroleum recovery process of claim 1 further including the step of applying sonic vibration to the fluidized slurry.

24. The petroleum recovery process of claim 1 further including the step of applying ultrasonic vibration to the fluidized slurry.

25. The petroleum recovery process of claim 1 wherein said processing step comprises allowing the fluidized slurry to stand in a settling tank, removing petroleum product from an upper region of the tank, removing sedimented solid contaminants from a lower region of the tank, and removing dispersion fluid from a mid-level region of the tank.

26. A petroleum recovery process, comprising the steps of:
   contacting a viscous petroleum product with an aqueous-based, dispersion fluid including sodium metasilicate by pressure injecting the dispersion fluid under relatively high pressure, high shear conditions into contact with the petroleum product to form a fluidized slurry; and processing the fluidized slurry to separate and recover the petroleum product, solid contaminants within the fluidized slurry and the dispersion fluid as independent products;

wherein said contacting step comprises the steps of injecting the dispersion fluid into contact with the petroleum product under relatively high pressure conditions to form the fluidized slurry, drawing the fluidized slurry through an injection chamber, and injecting additional dispersion fluid into contact with the slurry within the injection chamber under relatively high pressure and high shear conditions.

27. The petroleum recovery process of claim 26 wherein the dispersion fluid has a pH within the range of from about 11 to about 13.

28. The petroleum recovery process of claim 26 wherein the dispersion fluid further includes conditioning agents selected from the group consisting essentially of nonionic surfactants and emulsifiers.

29. The petroleum recovery process of claim 26 wherein said contacting step comprises injecting the dispersion fluid at a pressure within the range of from about 5,000 psi to about 40,000 psi into contact with the petroleum product.

30. The petroleum recovery process of claim 26 further including the step of drawing the fluidized slurry from the injection chamber through a sonic shear chamber, and applying sonic vibration to the fluidized slurry within the sonic shear chamber.

31. The petroleum recovery process of claim 26 further including the step of applying ultrasonic vibration to the fluidized slurry.

32. The petroleum recovery process of claim 26 wherein said processing step comprises allowing the fluidized slurry to stand in a settling tank, removing petroleum product from an upper region of the tank, removing sedimented solid contaminants from a lower region of the tank, and removing dispersion fluid from a mid-level region of the tank.

33. A process for cleaning residual petroleum product from inorganic surfaces, said process comprising the step of:

contacting residual petroleum product on an inorganic surface with an aqueous-based, negatively charged dispersion fluid to form a fluidized slurry, and for negatively charging the inorganic surface, wherein said contacting step comprises the steps of injecting the dispersion fluid into contact with the petroleum product under relatively high pressure conditions to form the fluidized slurry, drawing the fluidized slurry through an injection chamber, and injecting additional dispersion fluid into contact with the slurry within the injection chamber under relatively high pressure and high shear conditions.

34. The cleaning process of claim 33 further including the step of processing the fluidized slurry to separate and recover the petroleum product, solid contaminants and dispersion fluid therefrom as independent products.

35. The cleaning process of claim 33 wherein the negatively charged dispersion fluid has a pH within the range of from about 11 to about 13.

36. The cleaning process of claim 33 wherein the negatively charged dispersion fluid includes sodium metasilicate at a concentration within the range of from about 0.05% by volume to about 10.0% by volume.

37. The cleaning process of claim 36 wherein the negatively charged dispersion fluid further includes sodium hydroxide at a concentration of about 0.5% by volume.

38. The cleaning process of claim 33 wherein said contacting step includes injecting the dispersion fluid into contact with the petroleum product under relatively high pressure, high shear conditions.

39. The cleaning process of claim 38 wherein said contacting step comprises injecting the dispersion fluid at a pressure within the range of from about 5,000 psi to about 40,000 psi into contact with the petroleum product.

40. The cleaning process of claim 33 further including the step of applying sonic vibration to the fluidized slurry.

41. The cleaning process of claim 33 wherein said processing step comprises allowing the fluidized slurry to stand in a settling tank, removing petroleum product from an upper region of the tank, removing sedimented solid contaminants from a lower region of the tank, and removing dispersion fluid from a mid-level region of the tank.

* * * * *